United States Patent [19]

Browne

[11] Patent Number: 5,310,533
[45] Date of Patent: May 10, 1994

[54] PRODUCTION OF COPPER COMPOUNDS

[75] Inventor: Christopher J. Browne, Burnie, Australia

[73] Assignee: Australian Copper Company Pty. Ltd., Youngtown, Australia

[21] Appl. No.: 862,631

[22] Filed: Apr. 1, 1992

[30] Foreign Application Priority Data

Aug. 1, 1989 [AU] Australia .............................. PJ5552
Jun. 29, 1990 [AU] Australia ............................ 58043/90

[51] Int. Cl.$^5$ ............................................. C01G 3/02
[52] U.S. Cl. .................................... 423/604; 423/395; 423/413; 423/462; 423/557
[58] Field of Search .............. 423/604, 395, 413, 462, 423/557

[56] References Cited

U.S. PATENT DOCUMENTS

| | | | |
|---|---|---|---|
| 1,937,728 | 12/1933 | Storch | 423/604 |
| 2,104,754 | 1/1938 | Marsh et al. | 423/604 |
| 2,536,096 | 1/1951 | Rowe | 423/604 |
| 2,817,579 | 12/1957 | Drapeau et al. | 423/604 |
| 3,760,070 | 9/1973 | Joice et al. | 423/604 |
| 3,961,908 | 6/1976 | Touro | 23/290 |
| 4,944,935 | 7/1990 | Langner et al. | 423/604 |

FOREIGN PATENT DOCUMENTS 0235841 9/1987 European Pat. Off.
793932 2/1936 France.

OTHER PUBLICATIONS

Translation of V. F. Travkin et al., "Copper Extraction from Ammoniacal Solutions," from Zhurnal Pirkladnoi Khimii, vol. 56, No. 8, pp. 1730-1734, Aug. 1983.

Primary Examiner—Wayne Langel
Attorney, Agent, or Firm—Christensen, O'Connor, Johnson & Kindness

[57] ABSTRACT

A method of producing copper compounds involves contacting metallic copper with oxygen or an oxygen-containing gas, with an aqueous solution consisting essentially of water in solution in which is a soluble ammonium salt $NH_4X$, where X is the anion of the salt, and with ammonia in an amount such that the solution is initially alkaline. As a result of such contact the metallic copper is initially dissolved to form a copper ammine $Cu(NH_3)_4X$ and the formation of the ammine continues until the saturation concentration of the ammine is reached. Subsequently, the ammine continuously breaks down to form $3Cu(OH)_2 \cdot CuX_2$ and the water soluble products of the ammine decomposition continuously reform the amine by further reaction with the metallic copper and the oxygen on oxygen-containing gas.

9 Claims, 5 Drawing Sheets

PRODUCTION OF COPPER COMPOUNDS

FIELD OF THE INVENTION

The present invention relates to the treatment of metallic copper to produce intermediates which may themselves be readily processed into a wide range of copper compounds.

One such copper compound is copper sulphate.

BACKGROUND OF THE INVENTION

Copper sulphate ($CuSO_4.5H_2O$) is a compound used extensively in such areas as agriculture (as a soil additive in pesticides and as a feed additive), medicine, electric batteries, steel manufacture and the petroleum industry.

The difficulty in providing a starting point for manufacture of copper chemicals has always been the relative inactivity of the metal. The metal can be oxidised by heating in air, but this is expensive and slow, and the resultant oxide is not satisfactory as a source of cupric salts.

Traditionally, copper sulphate has been manufactured by reacting copper metal, usually copper scraps, with dilute (25%) sulphuric acid, in the presence of excess air, utilising the reaction:

$$Cu + H_2SO_4 + \tfrac{1}{2}O_2 \rightarrow CuSO_4 + H_2O \tag{1}$$

The reaction is endothermic and will not proceed at a satisfactory rate unless the temperature of the solution is maintained at a minimum of 70° C., and usually at more than 80°, for example to a temperature in the range 80° C. to 90° C.

An external heat source is required for this reaction, and steam is commonly used for this purpose.

The reaction is usually carried out by pumping the acid through towers packed with scrap copper, through which air is blown, or in submerged reactors, where the acid is agitated in a tank packed with scrap, and air is introduced by submerged aerators.

Air addition rates are usually required to be 7 to 10 times the stoichiometric amount, based on its oxygen content, giving an oxygen level of 7 times the stoichiometric amount.

The reaction is usually conducted batchwise, and is complete when the residual acid level falls to an acceptable level.

With such a process, production rates of 0.1 t/hour/m³ of reactor volume are rarely exceeded.

The resultant copper sulphate solution is cooled and the copper sulphate crystallises out and subsequently removed, usually by centrifuge. The crystals are dried and packed and the mother liquid is usually returned after acid enrichment, to the next batch.

This traditional method has several problems:

(a) Capital and maintenance costs must take into account the highly corrosive nature of aerated 25% hot sulphuric acid.

(b) The endothermic nature of the reaction, combined with the heat removal resulting from the high air flows required, result in the need for external heating either by steam or some other means.

(c) The process is non-selective in that metals other than copper in scrap, that will dissolve in hot sulphuric acid, can contaminate the product.

(d) The reaction rate is not fast, and production rates of 0.05 t/hour/m³ of reactor volume are common.

(e) The air effluent can contain sulphur dioxide, acid droplets and copper sulphate mist, and must be treated in some way.

(f) The necessity to recycle mother liquor leads to build-up of contaminants which must be removed by some method.

As a result of at least some of the above problems, energy costs may amount to in excess of $50/t of product.

It has also been long known that solutions of ammonia salts, or various combinations of them, will also attack copper metal, gain in the presence of oxygen. Copper ammines are produced, according to the equations:

$$Cu + \tfrac{1}{2}O_2 + 4NH_3 + H_2O \rightarrow Cu(NH_3)_4(OH)_2 \tag{2}$$

and $$Cu + \tfrac{1}{2}O_2 + 2NH_3 + 2NH_4X \rightarrow Cu(NH_3)_4X_2 + H_2O \tag{3}$$

or $$Cu + \tfrac{1}{2}O_2 + 2NH_3 + (NH_4)_2Y \rightarrow Cu(NH_3)_4Y\ H_2O \tag{4}$$

in the case of dibasic acid salts.

U.S. Pat. No. 3,760,070 discloses a process in which a reaction according to equation 3 is carried out. The copper ammine solution is then heated to produce copper oxide, and the ammonia and ammonium salt are recycled.

One major disadvantage of the process of U.S. Pat. No. 3,760,070 is the energy costs associated with the heating step.

An alternative ammonia/ammonium salt process uses organic strippers.

In this process copper scrap is reacted with a solution containing ammonia and ammonium carbonate, with aeration, under agitation. This solution rapidly dissolves copper up to a concentration of 30 g/l. The pregnant solution is then removed from the reactor and mixed with a proprietary organic liquid (for example one known as LIX54) which although immiscible with the aqueous ammine solution, has the power of stripping the pregnant solution of the contained copper, while leaving the NH₃ and Cu₃= in the aqueous phase. The stripped aqueous phase is then recycled to the reactor, while the separated organic layer, containing the copper ions, is reacted with dilute sulphuric acid, which forms copper sulphate. This migrates to the aqueous phase, leaving the organic layer stripped of copper.

The organic layer is then separated for re-use, while the aqueous phase is evaporated, cooled, and the copper sulphate recovered in the usual way.

This method has the following advantages:

(a) Maintenance costs are lower because the reacting medium is alkaline.

(b) The reaction is exothermic, and is therefore self-sustaining, energy wise.

(c) The process is selective, as only those metals soluble in ammonia are attached.

(d) The reaction rate is quite fast and rates of 0.1–0.2 t/hr/m³ of reactor volume are common. but also has the following disadvantages:

(a) Capital costs for machinery are reasonable, but the cost of the organic stripper can be as high as $20,000 m$^3$ of reactor volume.

(b) Losses of organic stripper can usually be reckoned to be in the order of $10 to 50 per tonne of copper sulphate product.

(c) The organic stripper is prone to what is known as "crudding up" due to impurities, leading to even higher losses.

(d) Ammonia recovery systems are required to recover expensive ammonia from the effluent gas and solid residues.

Generally all except very large producers have remained with the "lesser of the two evils" and have used the acid route.

Various organic strippers have also been developed for stripping copper ions out of acid copper sulphate solution, but these also suffer from the problem of reagent loss and "crudding" referred to above.

It is an object of this invention to provide an improved process for producing copper compounds.

The invention provides, a method of producing copper compounds, including the step of contacting metallic copper with oxygen or an oxygen-containing gas, and an aqueous solution consisting essentially of water in solution in which, to a concentration up to the limit of solubility thereof, is a soluble ammonium salt $NH_4X$, where X is the anion of said salt, together with ammonia in an amount such that initially said solution is alkaline, whereby as a result of said contact said metallic copper is initially dissolved to form a copper ammine $Cu(NH_3)_4X$ said ammine formation proceeding until the saturation concentration of said ammine is reached, whereafter said ammine continuously breaks down to form the water insoluble tribasic salt $3Cu(OH)_2.CuX_2$, and the water-soluble products of the decomposition of said ammine continuously reform the said ammine by further reaction with said metallic copper and said oxygen or oxygen-containing gas until said solution becomes exhausted of the said anion.

The invention also provides apparatus for carrying out a method of producing copper compounds, including a cylindrical reaction tank fitted with a circular screen such that copper metal is confined to the area between the screen and the tank walls, and having a bladed agitator located inside the screen driven at a minimum tip speed of 500 meters/minute, and also providing for the introduction of an oxygen containing gas at or near the agitator blades;

said tank being provided with means of adding acid at a controlled rate; and said tank being fitted with a solids removal system such that the said water insoluble tribasic copper salt is removed from the reacting solution at a controlled rate.

It has been discovered that if an aqueous solution of an ammonium salt of any of the common acids (for example sulphuric, hydrochloric or nitric) is prepared at any strength up to saturation level, and this solution is made alkaline with aqueous ammonia, preferably to a pH of 7.0 to 8.0, and this solution is then allowed to react with copper metal in the presence of oxygen, then an aqueous medium is produced, which is capable of rapid conversion of copper metal, in the presence of oxygen, into the insoluble tribasic salt, under certain minimum conditions of agitation and aeration, until all the acid ions contained in the original aqueous solution are exhausted.

Furthermore, if the acid ions removed from the original solution, by formation of the insoluble tribasic salt, are replaced by addition of the relevant acid to the aqueous medium at an equivalent rate, after the formation of the tribasic salt has begun to occur, and if the resultant solid tribasic salt is removed from the aqueous medium by, for example, filtration, then a continuous cyclic reaction occurs where copper ammine is continuously formed from the copper metal, and is continuously decomposed to the tribasic salt, at a rapid rate.

The nett effect is a continuous process for conversion of copper metal into solid $3Cu(OH)_2.CuSO_4$ (Brochantite) in the case of ammonium sulphate, $3Cu(OH)_2.CuCl_2$ (Atacamite or copper oxychloride) in the case of ammonium chloride, or $3Cu(OH)_2.Cu(NO_3)_2$ in the case of ammonium nitrate.

These tribasic salts can easily be converted into the relevant acid salt by addition of a stoichiometric quantity of the relevant acid, according to the equation $$3Cu(OH)_2CuX_2 + 6HX \rightarrow 4CuX_2 + 6H_2O \qquad (5)$$

or $$3Cu(OH)_2CuY + 3H_2Y \rightarrow 4CuY + 6H_2O \qquad (6)$$

in the case of a dibasic acid.

This process can be controlled, if necessary, to produce direct crystalline salts, by use of the acid in concentrated form.

Equally, the tribasic salt can easily be converted to copper hydroxide by addition of a stoichiometric quantity of an alkali such as sodium hydroxide, according to the equation $$3Cu(OH)_2CuX_2 + 2NaOH \rightarrow 4Cu(OH)_2 + 2NaX \qquad (7)$$

and $$3Cu(OH)_2CuY_2 + 2NaOH \rightarrow 4Cu(OH)_2 + 2NaY \qquad (8)$$

the insoluble hydroxide can be recovered by filtration and washing.

However, it should be noted that the tribasic salts themselves, particularly the sulphate and chloride, find direct application as fungicides. The invention thus also provides a direct method for the manufacture of such tribasic salts.

The reaction mechanism appears to involve initial formation of copper ammine, according to the equation $$Cu + \tfrac{1}{2}O_2 + 4NH_4^+ \rightarrow Cu(NH_3)_4^{++} + H_2O + 2H^+ \qquad (9)$$

This reaction proceeds until the copper content of the solution approaches 28 g/l. At this point the ammine decomposes according to the equation $$4Cu(NH_3)_4^{++} + 8X^- + 6H_2O \rightarrow 3Cu(OH)_2.CuX_2 + 10NH_3 + 6NH_4^+ + 6X^- \qquad (10)$$

in the case of a monobasic acid salt, or $$4Cu(NH_3)_4^{++} + 4Y^- + 6H_2O \rightarrow 3Cu(OH)_2.CuY + 10NH_3 + 6NH_4^+ + 6Y^- \qquad (11)$$

in the case of a dibasic acid salt.

This results in the formation of the tribasic salt, accompanied by the release of all of the contained ammonia and most of the contained acid anions, which are then available for the formation of further copper ammine.

Thus the reaction continues to produce tribasic copper salt, while maintaining the copper ammine level in the reaction liquor at the saturation concentration.

The reaction can plainly be seen to only continue whilst sufficient acid anions are available for formation of the tribasic salt, because only 75% of the anion is released.

The process of the present invention involves the exposure of copper metal to the reacting solution in the presence of oxygen or an oxygen containing gas, and depends on a reaction between these components at the copper surface.

Such reactions are usually conducted by either pumping the reacting solution through a vessel containing the copper metal, into which oxygen or air is blown, or by agitating the reaction solution in a vessel in which the copper metal is placed, whilst blowing oxygen or air into the solution.

Because the reaction of this invention involves the formation of solids in suspension in the reacting solution, resulting in changes in solution viscosity and density, the latter method is preferred, to avoid such problems as tower blockage, channelling and the like.

Figure 1:
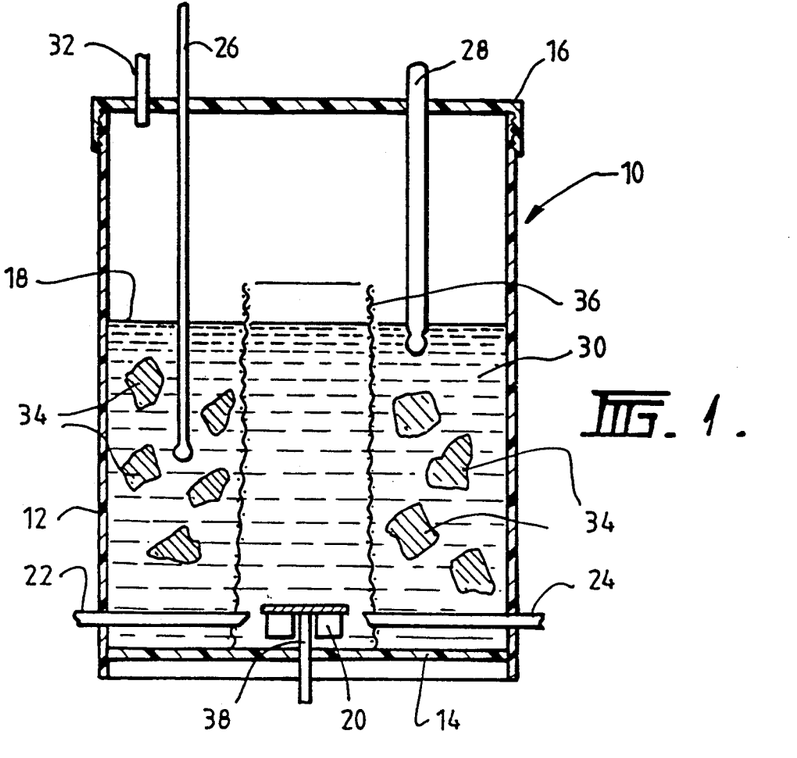
FIG. 1 is a section through one reactor capable of carrying out the process in accordance with the invention.

A preferred reactor to carry out the process of the present invention has been designed. A laboratory model constructed to the design is shown in FIG. 1. The reactor 10 has a circular body 12 (preferably formed from a 13 cm length of 10 cm diameter PVC pipe) with a solid base 14 (preferably also of PVC) and a screw top lip 16 preferably also of PVC. The internal volume was one liter, and is fitted with a circular screen 36.

Agitation of the contents (liquid level shown at 18) is effected by an agitator 20 (preferably bladed, preferably of 2 cm diameter and being preferably a polythene turbo agitator located axially) driven by a motor (not shown), preferably a 12 v DC motor capable of being located beneath the reactor 10. A preferred speed for the agitator 20 is up to 9,000 rpm.

Air entry ports 22,24, preferably formed from polythene, are located close to agitator 20 and preferably diametrically opposite one another, towards the base 14 of the reactor 10. The points 22,24 are serviced by, preferably, a constant speed positive displacement air pump (not shown) located outside reactor 10. Other air supply means may be used. For example, air could be introduced through the agitator shaft 38.

A thermometer 26 and pH probe 28 external through lid 16 so that they are immersed in the liquid 30. An air vent 32 is also located in lid 16.

In a preferred use, copper scrap (for example copper wire) 34 is placed between screen 36 and walls 12, to a depth of 2 cm, and the reactor charged with 400 ml of reaction solution. Air was supplied at the rate of 1 liter/minute from a positive displacement air pump (not shown) and introduced into the solution at a point adjacent to the agitator blades.

In all experiments using the reactor 10 to carry out the process of this invention, a standard ammonium salt concentration of 150 g/l was used, as experience had shown that this was the optimum concentration for ease of handling, and also appeared to give best performance.

A standard initial liquor temperature of 15° C. was used, as this is the average temperature likely to be encountered in practical operations.

All pH adjustments were carried out using 25% W/W commercial aqueous ammonia.

Several trials were conducted with the reactor of FIG. 1, and are described in the form of Examples 1 to 6 inclusive.

EXAMPLE 1

Figure 2:
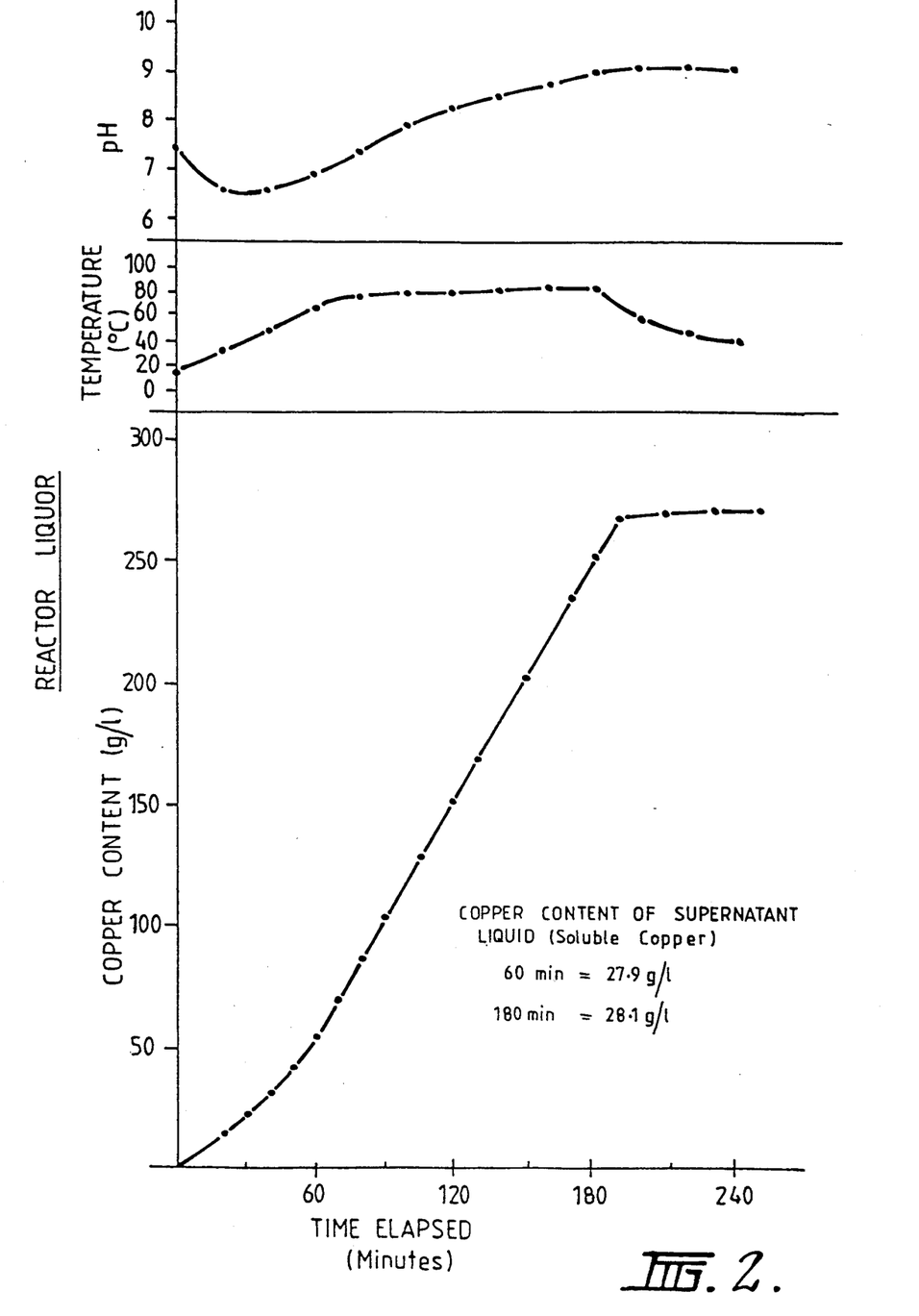
FIG. 2 is a graph showing results of Example 1.

100 grams of copper wire and 400 ml of 150 g/l ammonium sulphate solution, which had been adjusted to pH 7.3 with aqueous ammonia, were added to the reactor, and the agitator was operated at 9000 rpm. The pH, temperature and copper content of the liquor were monitored over a 3 hour period. The results are shown in FIG. 2.

The pH initially fell to 6.5, stabilised and then gradually increased. The minimum pH period corresponded to the period of initial solid formation in the liquor, at a copper content of 28 g/l. Thereafter solid formation continued at a rapid rate, such that the total copper content of the reaction liquor rose at a constant rate of 100 gram/liter/hour, whilst the soluble copper content of the liquor remained at around 28 g/l.

This continued until the copper content of the liquor reached 270 g/l, when the reaction ceased.

The solid precipitate formed in the liquor, representing the insoluble copper content, was recovered by filtration, washing and drying, and was identified as $9CuO.SO_3.12H_2O$, which can be rewritten as $4CuO.SO_3.5Cu(OH)_2.2H_2O$.

EXAMPLE NO. 2

Figure 3:
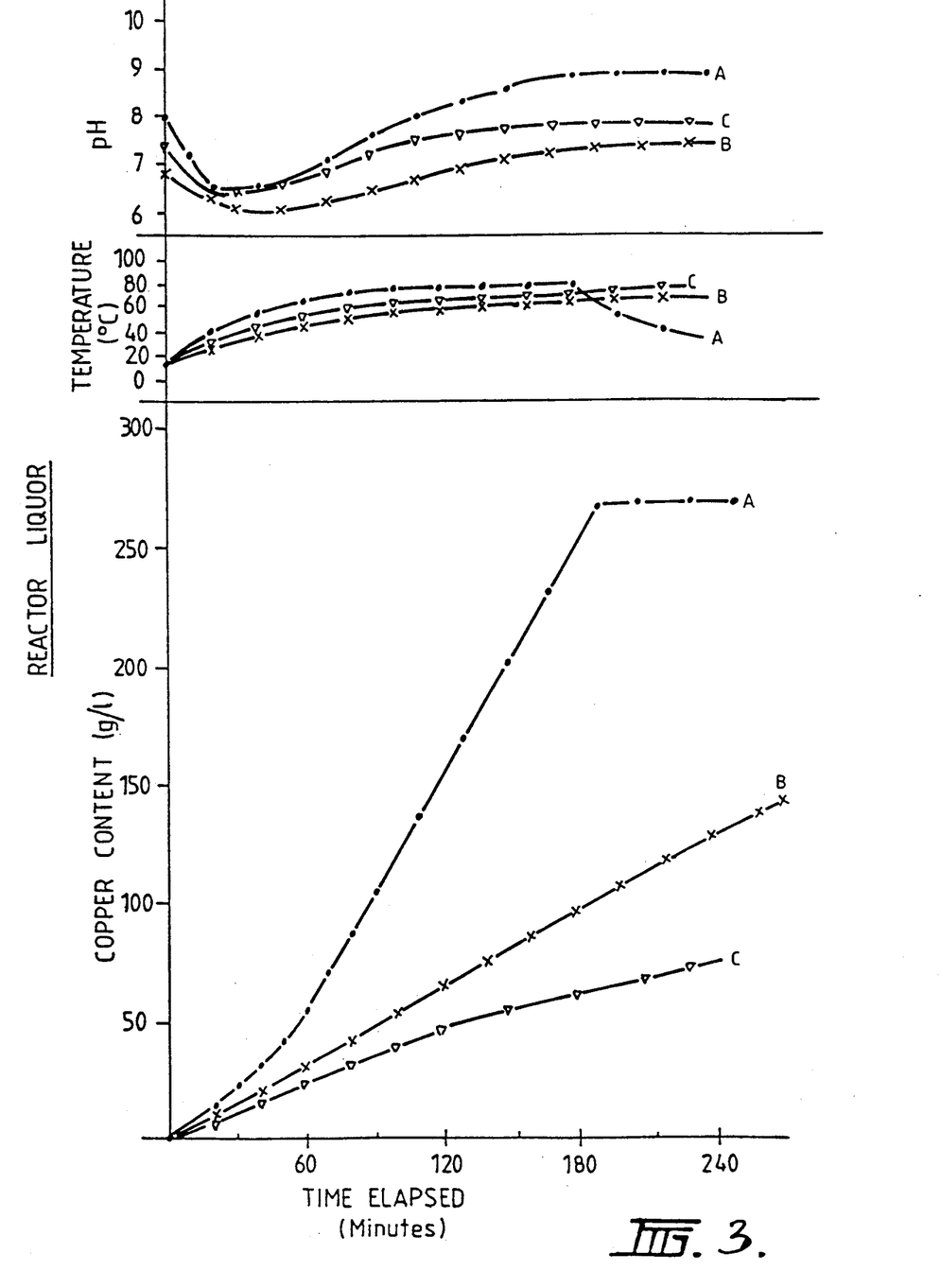
FIG. 3 is a graph showing results of Examples 2,3 and 4.

This was identical to Example No. 1, except that an initial pH of 8.0 was used. The results are shown in FIG. 3, line A.

EXAMPLE NO. 3

This was identical to Example No. 1, except that an initial pH of 8.0 was used. The results are shown in FIG. 3, line B.

EXAMPLE NO. 4

This was identical to Example No. 1, except that an agitator speed of 6000 rpm was used. The results are shown in FIG. 3, line C.

EXAMPLE NO. 5

Figure 4:
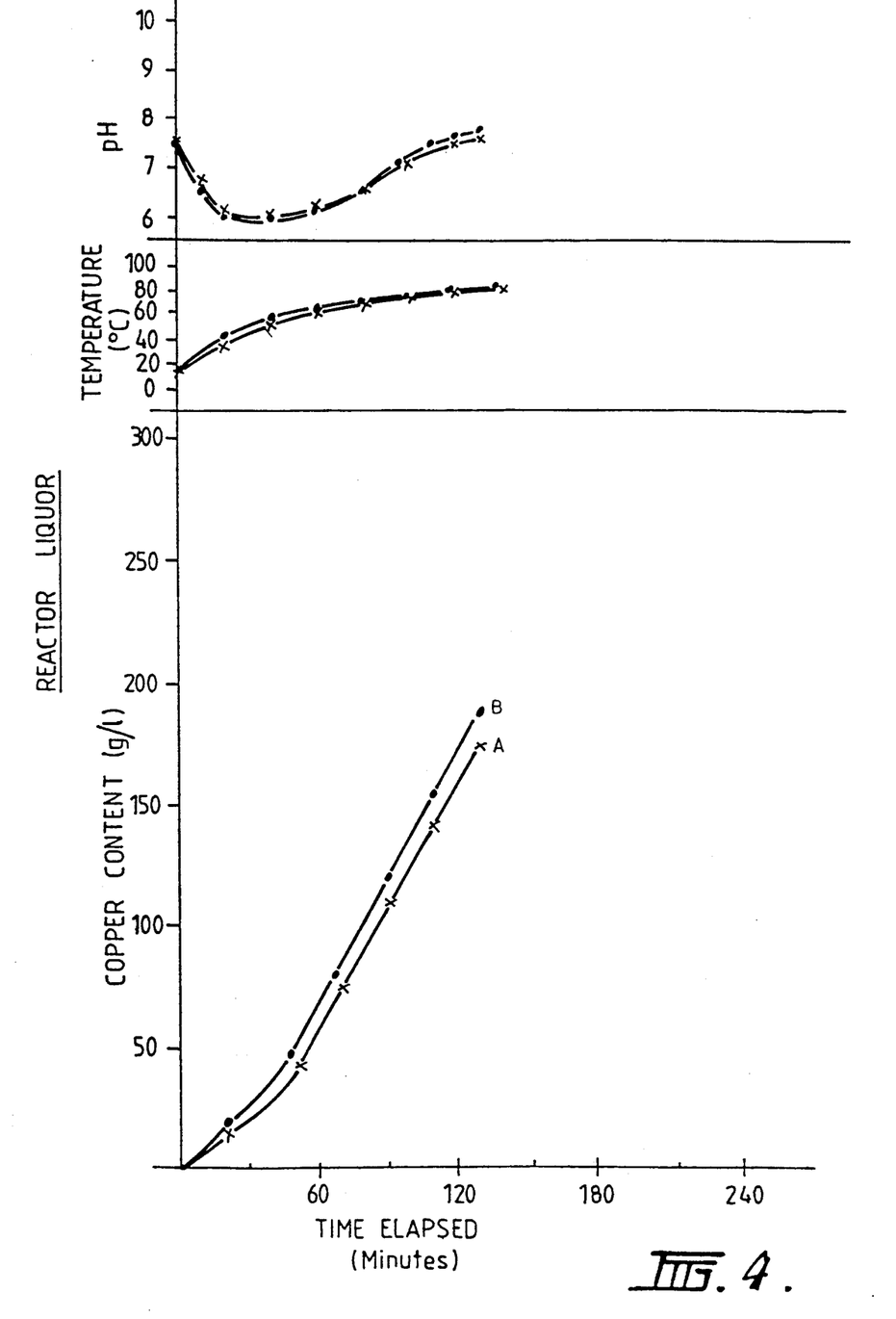
FIG. 4 is a graph showing results of Examples 5 and 6.

This was identical to Example No. 1, except that ammonium chloride was used in place of ammonium sulphate. The results appear in FIG. 4, line A. The solid precipitate formed was identified as $3.Cu(OH)_2CuCl_2$.

EXAMPLE NO. 6

This was identical to Example No. 1, except that ammonium nitrate was used. The results appear in FIG. 4, line B. The solid precipitate formed was identified as $3Cu(OH)_2 \cdot Cu(NO_3)_2$.

Figure 6:
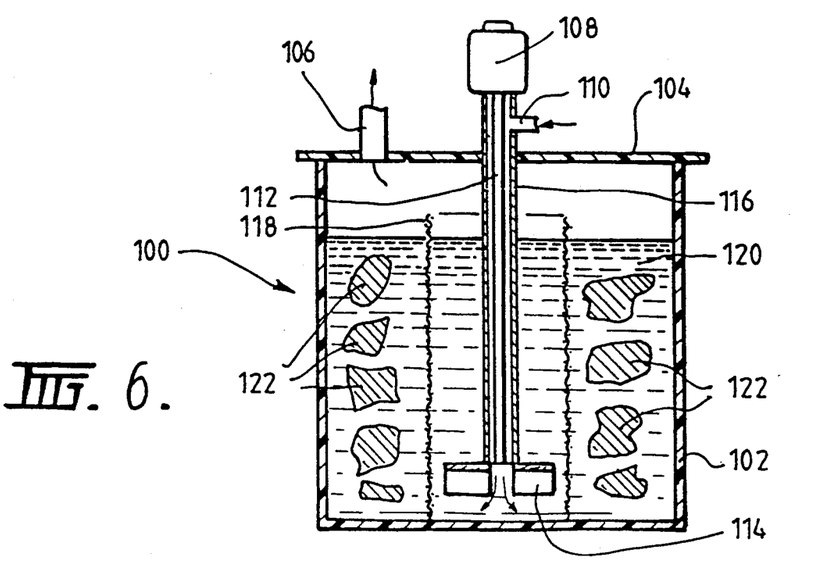
FIG. 6 is a section through another reactor capable of carrying out the process in accordance with the invention.

The previously described reactor of FIG. 1 was upgraded to pilot plant scale by constructing the reactor of FIG. 6.

In FIG. 6, the reactor 100 is formed from a generally circular tank 102, preferably formed from stainless steel. Preferred dimensions are 1.5 m diameter and 1.5 m in depth. Tank 102 has a top portion 104, with an exhaust vent 106 therein.

An agitator 114 has a shaft 112 driven by a drive 108, preferably an electric motor. The shaft 112 is located within a tube 116 into which air from a blower or the like is introduced via an inlet 110. Air exits from the base of tube 116 as indicated by the arrows near the base of tank 102.

The preferred-dimension tank has a capacity of 1500 l, and the agitator design may be scaled up from the FIG. 1 arrangement to suit that capacity. Preferably, the agitator speed is adjusted so that the tip speed is identical with the reactor of FIG. 1, used in Examples 1 to 5.

A generally cylindrical screen 118 is located in tank 102, and copper scrap 122 (in the form of copper wire or the like) is located in reaction liquor 120 between screen 118 and tank walls 102.

Two trials were carried out using the reactor of FIG. 6, and are described hereinafter as Examples 7 and 8.

EXAMPLE NO. 7

The reactor was charged with ¾ tonne of copper scrap in the form of wire, bales and cut piping, which was confined between the tank walls and a circular screen, 1500 liters of 150 g/l ammonium sulphate was introduced into the reactor, and the liquor pH was adjusted to 7.3 using aqueous ammonia. The reactor was operated for 3 hours and the pH, temperature and copper content of the liquor were monitored. The results were identical to those shown in FIG. 2.

EXAMPLE NO. 8

Figure 5:
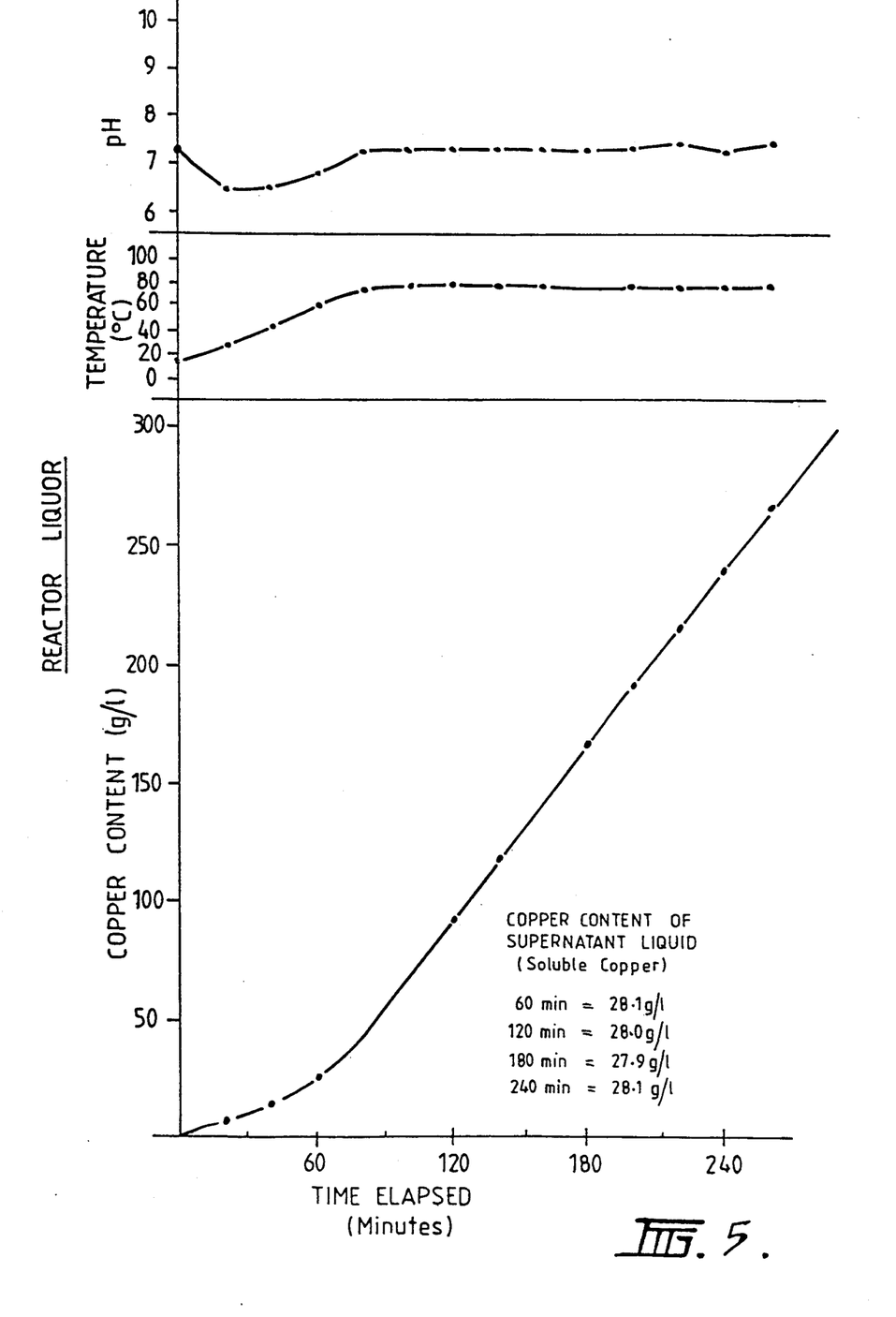
FIG. 5 is a graph showing the results of Example 8.

Example No. 7 was repeated, but after the pH had risen to 7.3 (80 minutes elapsed time) the pH was monitored to 7.3±0.1 by addition of concentrated sulphuric acid, run in from a head tank through a control valve. The example was operated for a total of 4 hours and the results appear in FIG. 5.

The final copper liquor was a very thick slurry which became difficult to agitate. The final copper content was 480 g/l, of which only 28 g/l was present as soluble copper. A reaction rate of 153 g/l copper/hour was achieved, after pH adjustment was introduced. The solid precipitate formed was identified as $3Cu(OH)_2 \cdot CuSO_4$ It should be noted that the present invention could be considered as a fuel cell, that is, a process or device which produces energy from the interaction of certain substances.

I claim:

1. A method of producing copper compounds comprising contacting metallic copper with oxygen or an oxygen-containing gas and an aqueous solution consisting essentially of soluble ammonium salt and ammonia, said salt being present in said solution in a concentration up to the solubility limit thereof, said ammonia being present in an amount such that initially said solution is alkaline, whereby as a result of said contact said metallic copper dissolves to form a copper amine and the concentration of said copper amine in solution increases until the saturation concentration of said copper amine in solution is reached, whereafter said copper amine continuously breaks down to form a water insoluble tribasic salt, and water soluble decomposition products, said water soluble decomposition products being available for further reaction with said metallic copper and said oxygen or oxygen-containing gas to thereby continuously form further copper amine to maintain the concentration of said copper amine in solution substantially at said saturation concentration until said solution becomes exhausted of an anion of said soluble ammonium salt, said tribasic salt being separated from said solution, washed and dried.

2. A method according to claim 1, wherein
   (a) said solution is contained in a cylindrical reaction tank fitted with a circular screen such that copper metal is confined to the area between the screen and the tank walls, and having a bladed agitator located inside the screen driven at a minimum tip speed of 500 meters/minute, with provision for the introduction of oxygen or oxygen-containing gas at or near the agitator blade;
   (b) said tank is provided with a means of adding an acid containing said anion at a controlled rate; and
   (c) said tank is fitted with a solids removal system such that said tribasic salt is removed from said solution at a controlled rate.

3. The method of claim 1, wherein ammonia is present in said solution such that the initial pH of said solution is 8.0 or less.

4. A method of producing copper compounds comprising contacting metallic copper with oxygen or an oxygen-containing gas and an aqueous solution consisting essentially of a soluble ammonium salt and ammonia, said salt being present in said solution in a concentration up to the solubility limit thereof, said ammonia being present in an amount such that initially said solution is alkaline, whereby as a result of said contact said metallic copper dissolves to form a copper amine and the concentration of said copper amine in solution increases until the saturation concentration of said copper amine in solution is reached, whereafter said copper amine continuously breaks down to form a water insoluble tribasic salt, and water soluble decomposition products, said water soluble decomposition products being available for further reaction with said metallic copper and said oxygen or oxygen-containing gas to thereby continuously form further copper amine to maintain the concentration of said copper amine in solution substantially at said saturation concentration, said tribasic salt being separated from said solution, washed and dried, an anion of said soluble ammonium salt being continuously replaced in said solution as it is removed by the formation of said tribasic salt, by the addition of an acid containing said anion at an equivalent rate accompanied by removal of said tribasic salt from said solution at a rate sufficient to maintain an acceptable level of solids in the reaction medium, thereby causing the continuous production of said tribasic salt in solid form.

5. The method according to claim 1 or 4, wherein said ammonium salt is selected from ammonium sulfate, ammonium chloride, and ammonium nitrate.

6. The method according to claim 4, wherein said solution is contained in a cylindrical reaction tank fitted with a circular screen such that copper metal is confined to the area between the screen and the tank walls, and having a bladed agitator located inside the screen driven at a minimum tip speed of 500 meters/minute, with provision for the introduction of oxygen or oxygen-containing gas at or near the agitator blade;

said tank is provided with a means of adding the acid of said anion at a controlled rate; and said tank is fitted with a solids removal system such that said tribasic salt is removed from said solution at a controlled rate.

7. The method of claim 4, wherein ammonia is present in said solution such that the initial pH of said solution is 8.0 or less.

8. A method of producing copper compounds comprising:

contacting metallic copper with oxygen or an oxygen-containing gas and an aqueous solution consisting essentially of a soluble ammonium salt and ammonia, said salt being present in said solution in a concentration up to the solubility limit thereof, said ammonia being present in an amount such that initially said solution is alkaline, whereby as a result of said contact said metallic copper dissolves to form a copper amine and the concentration of said copper amine in solution increases until the saturation concentration of said copper amine in solution is reached, whereafter said copper amine continuously breaks down to form a water insoluble tribasic salt and water soluble decomposition products, said water soluble decomposition products being available for further reaction with said metallic copper and said oxygen or oxygen-containing gas to thereby continuously form further copper amine to maintain the concentration of said copper amine in solution substantially at said saturation concentration until said solution becomes exhausted of an anion of said soluble ammonium salt, said tribasic salt being separated from said solution by filtration, washing and drying.

9. A method of producing copper compounds comprising contacting metallic copper with oxygen or an oxygen-containing gas and an aqueous solution consisting essentially of a soluble ammonium salt and ammonia, said salt being present in said solution in a concentration up to the solubility limit thereof, said ammonia being present in an amount such that initially said solution is alkaline, whereby as a result of said contact said metallic copper dissolves to form a copper amine and the concentration of said copper amine in solution increases until the saturation concentration of said copper amine in solution is reached, whereafter said copper amine continuously breaks down to form a water insoluble tribasic salt, and water soluble decomposition products, said water soluble decomposition products being available for further reaction with said metallic copper and said oxygen or oxygen-containing gas to thereby continuously form further copper amine to maintain the concentration of said copper amine in solution substantially at said saturation concentration, said tribasic salt being separated from said solution, an anion of said soluble ammonium salt being continuously replaced in said solution as it is removed by the formation of said tribasic salt, by the addition of an acid containing said anion at an equivalent rate accompanied by removal of said tribasic salt from said solution at a rate sufficient to maintain an acceptable level of solids in the reaction medium, thereby causing the continuous production of said tribasic salt in solid form.

* * * * *

UNITED STATES PATENT AND TRADEMARK OFFICE
CERTIFICATE OF CORRECTION

PATENT NO. : 5,310,533
DATED : May 10, 1994
INVENTOR(S) : C. J. Browne

It is certified that error appears in the above-indentified patent and that said Letters Patent is hereby corrected as shown below:

| COLUMN | LINE | |
|---|---|---|
| 1 | 2 | after the title, please insert --This application is a continuation of PCT/AU90/00323, filed 1 August 1990.-- |
| 5 | 46 | "1O cm" should read --10cm-- |
| 5 | 61 | "points 22,24" should read --points 22, 24-- |

Signed and Sealed this

Eighteenth Day of October, 1994

BRUCE LEHMAN

Attest:

Attesting Officer     Commissioner of Patents and Trademarks